US012691578B2

(12) United States Patent (10) Patent No.: US 12,691,578 B2
Lee et al. (45) Date of Patent: Jul. 28, 2026

(54) ROTATION MECHANIC EQUIPMENT

(71) Applicant: TECHMAN ROBOT INC., Taoyuan City (TW)

(72) Inventors: Ching-Wei Lee, Taoyuan City (TW); Chun-Wen Lai, Taoyuan City (TW)

(73) Assignee: TECHMAN ROBOT INC., Taoyuan City (TW)

( * ) Notice: Subject to any disclaimer, the term of this patent is extended or adjusted under 35 U.S.C. 154(b) by 199 days.

(21) Appl. No.: 18/661,757

(22) Filed: May 13, 2024

(65) Prior Publication Data

US 2025/0170711 A1 May 29, 2025

(51) Int. Cl.
*B25J 9/16* (2006.01)
*B25J 9/12* (2006.01)
*G05B 19/402* (2006.01)
*G05B 19/404* (2006.01)

(52) U.S. Cl.
CPC ............. *B25J 9/1641* (2013.01); *B25J 9/126* (2013.01); *B25J 9/1633* (2013.01); *B25J 9/1651* (2013.01); *G05B 19/402* (2013.01); *G05B 19/404* (2013.01); *G05B 2219/39194* (2013.01)

(58) Field of Classification Search
CPC ........ B25J 9/1641; B25J 9/126; B25J 9/1633;

B25J 9/1651; B25J 13/00; B25J 19/00; G05B 19/402; G05B 19/404; G05B 2219/39194; G01H 17/00; H02P 29/00

See application file for complete search history.

(56) References Cited

U.S. PATENT DOCUMENTS

2012/0065902 A1* 3/2012 Nakajima .............. B25J 13/085
702/56

FOREIGN PATENT DOCUMENTS

EP 2154779 A2 * 2/2010 .............. H02P 23/04
EP 2361736 B1 * 1/2020 ............ B25J 9/1633

OTHER PUBLICATIONS

Mikhail Tsypkin, Induction Motor Condition Monitoring: Vibration Analysis Technique—a Twice Line Frequency Component as a Diagnostic Tool, 2013, IEEE, 117-123 (Year: 2013).*
Lei Yang, Vibration Suppression of Flexible Systems by Velocity Feedback, 2019, IEEE, 1014-1020 (Year: 2019).*

* cited by examiner

*Primary Examiner* — Bickey Dhakal
(74) *Attorney, Agent, or Firm* — WPAT, PC

(57) ABSTRACT

A rotating mechanical equipment is provided. The rotating mechanical equipment detects a vibration based on 2 times the rotation frequency to suppress the vibration of the rotating mechanical equipment.

6 Claims, 13 Drawing Sheets

ROTATION MECHANIC EQUIPMENT

This application claims the benefit of Taiwan application Serial No. 112145358, filed Nov. 23, 2023, the subject matter of which is incorporated herein by reference.

BACKGROUND OF THE INVENTION

Field of the Invention

The invention relates in general to a rotating mechanical equipment, and more particularly to the vibration detection based on 2 times the rotation frequency and the vibration suppression of the rotating mechanical equipment.

Description of the Related Art

Vibration usually occurs during the operation of a rotating mechanical equipment and may occur to one or more than one device of the equipment. Or, vibration may occur to different devices concurrently or separately. Vibration significantly affects the performance and accuracy of the rotating mechanical equipment during operation.

In view of the problems identified during product development, the present invention provides a rotating mechanical equipment capable of suppressing the vibration of the rotating mechanical equipment and resolving the said vibration problems to improve the performance and accuracy of the equipment.

SUMMARY OF THE INVENTION

According to one object of the present invention, a rotating mechanical equipment is provided. The rotating mechanical equipment detects a vibration based on 2 times the rotation frequency to suppress the vibration so that the performance and accuracy of the equipment can be improved.

According to another object of the present invention, a rotating mechanical equipment is provided. At the initial operation, the rotating mechanical equipment detects a vibration based on 2 times the rotation frequency then stores the detection information; at subsequent operation, the rotating mechanical equipment activates vibration suppression based on the detection information to improve the performance and accuracy of the equipment.

To achieve the above objects, the rotating mechanical equipment of the present invention detects a vibration based on 2 times the rotation frequency.

In one embodiment, the rotating mechanical equipment detects the vibration of a reducer based on 2 times the rotation frequency.

In one embodiment, the rotating mechanical equipment includes a micro control circuit and a rotation module. The micro control circuit receives a position command then generates a control signal based on the position command to control the rotation frequency. The rotation module is coupled to the micro control circuit to receive the control signal then operates at the rotation frequency based on the control signal.

In one embodiment, the micro control circuit includes a first differential circuit, a position circuit, a second differential circuit, a speed circuit, a third differential circuit and a current controller. The first differential circuit receives position command then outputs a first differential signal based on the position command. The position circuit is coupled to the first differential circuit to receive the first differential signal then outputs a position output signal based on the first differential signal. The second differential circuit is coupled to the position circuit to receive the position output signal then generates a second differential signal based on the position output signal. The speed circuit is coupled to the second differential circuit to receive the second differential signal then generates a speed output signal based on the second differential signal. The third differential circuit is coupled to the speed circuit to receive the speed output signal then generates a third differential signal based on the speed output signal. The current controller is coupled to the third differential circuit to receive the third differential signal then generates a control signal based on the third differential signal.

In one embodiment, the rotation module includes a motor, a first encoder, a reducer and a second encoder. The motor is coupled to the micro control circuit to receive the control signal then operates at the rotation frequency based on the control signal. The first encoder is connected to the motor to detect the rotation frequency of the motor then generates a first detection signal. The reducer is connected to the motor through the first encoder to operate at the circled frequency based on the rotation frequency of the motor. The second encoder is connected to the reducer to detect the circled frequency of the reducer then generates a second detection signal to the micro control circuit.

Moreover, the rotating mechanical equipment includes a detection circuit and a vibration suppression circuit. The detection circuit receives the position command then generates a detection signal based on the position command. The vibration suppression circuit is coupled to the detection circuit to receive the detection signal to suppress the vibration.

In one embodiment, the detection circuit includes a command operation circuit and a judgment circuit. The command operation circuit receives the position command to calculate a command speed of the position command. The judgment circuit is coupled to the command operation circuit to receive the command speed then compares the command speed with a command threshold to generate a judgment signal. Besides, the detection circuit starts a detection based on the judgment signal and detects the amplitude whose frequency is 2 times the rotation frequency to generate the detection signal.

In one embodiment, the vibration suppression circuit includes a compensation coefficient and is coupled to a first encoder and a second encoder to receive the first detection signal and a second detection signal then calculates a compensation signal based on the compensation coefficient, the first detection signal and the second detection signal to compensate a torque control loop.

In one embodiment, the rotating mechanical equipment includes a robotic arm and a gravity sensor. The gravity sensor is arranged on the robotic arm to generate a gravity signal based on the rotation frequency. The gravity sensor is coupled to the micro control circuit to transmit the gravity signal to the micro control circuit then adjusts the rotation frequency.

Also, the rotating mechanical equipment detects a vibration based on a position command and 2 times the rotation frequency; following the detection, the rotating mechanical equipment stores a detection information relevant to position command and activates vibration suppression based on the position command and the detection information.

In one embodiment, the first differential circuit is coupled to the first encoder to receive the position command and the first detection signal then outputs a first differential signal based on the position command and the first detection signal. The second differential circuit is coupled to the first differential circuit and the first encoder to generate a second differential signal based on the first differential signal and the first detection signal. The third differential circuit is coupled to the second differential circuit and the motor to generate a in third differential signal based on the second differential signal and a motor current for the generation of a control signal.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
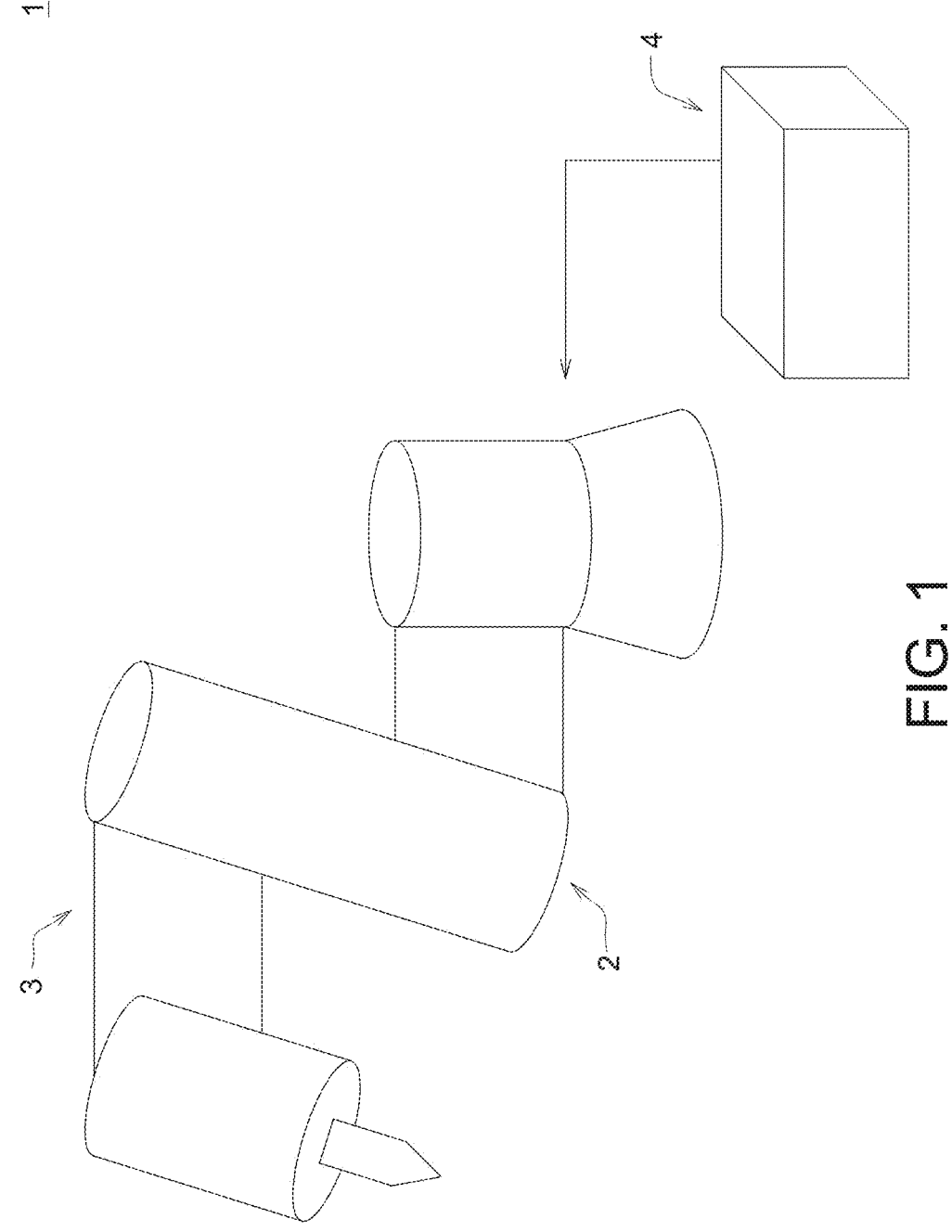
FIG. 1 is a schematic diagram of a rotating mechanical equipment of the present invention.

Referring to FIG. 1, a schematic diagram of a rotating mechanical equipment of the present invention is shown. As indicated in the diagram, the rotating mechanical equipment 1 includes a robotic arm and a control host 4. The robotic arm includes a plurality of joint devices 2 and a plurality of axial arms 3. The joint devices 2 and the axial arms 3 are serially connected to each other to form the robotic arm. The control host 4 is coupled to the robotic arm to output relevant signals or data and control the operation of the robotic arm.

Figure 2:
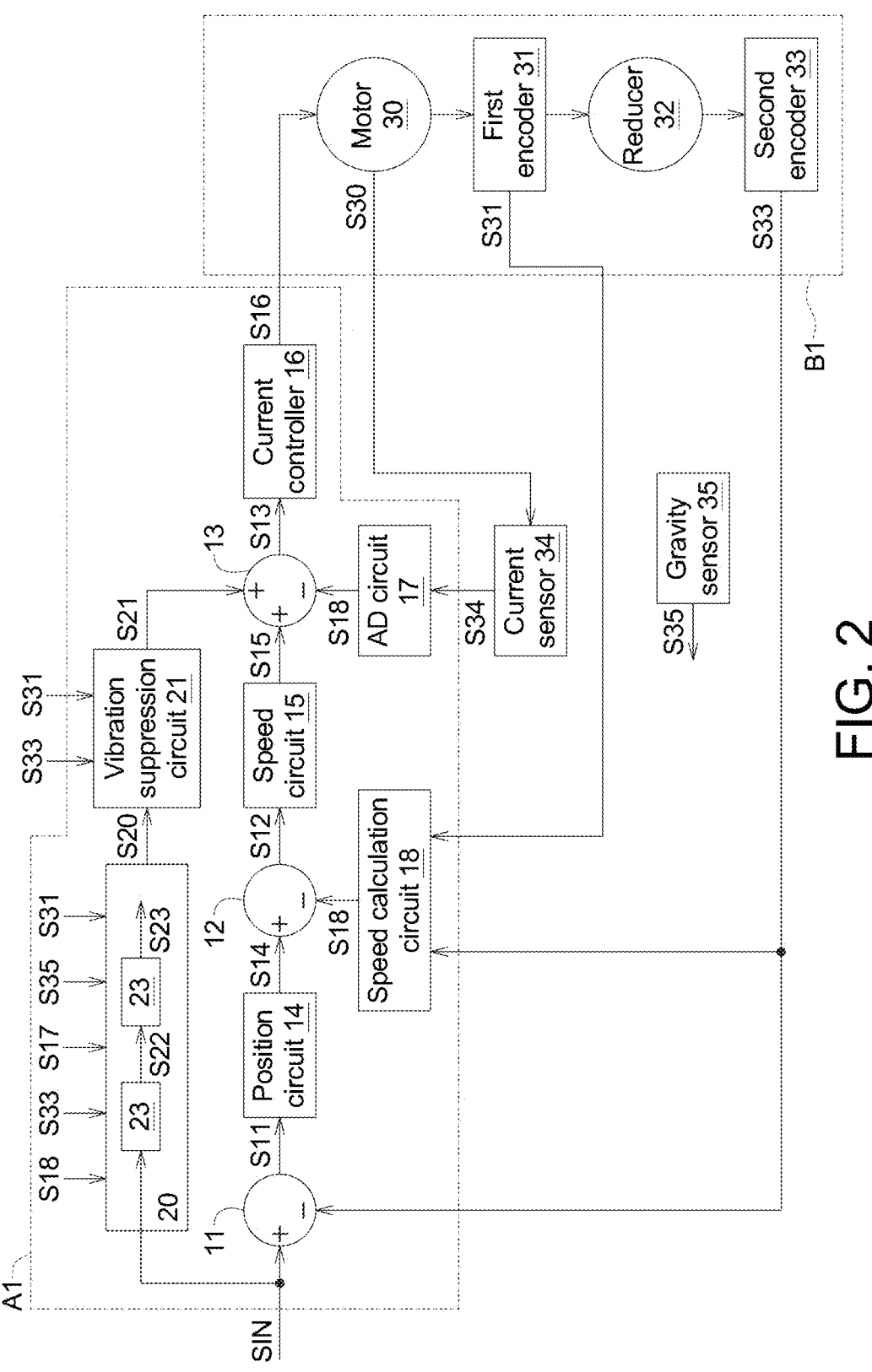
FIG. 2 is a circuit diagram of a first embodiment of partial circuits of a rotating mechanical equipment of the present invention.

Referring to FIG. 2, a circuit diagram of a first embodiment of partial circuits of a rotating mechanical equipment of the present invention is shown. As indicated in the diagram, the rotating mechanical equipment 1 includes a micro control circuit A1 and a rotation module B1. The micro control circuit A1 can be selectively arranged on the joint devices 2 or the control host 4, and both arrangements are allowed. Therefore, the rotating mechanical equipment 1 may include one or more than one micro control circuit A1, and the design of driving a plurality of joint devices 2 using a single micro control circuit A1 is not described in detail here. The micro control circuit A1 is coupled to the rotation module B1 to drive the rotation module B1 in rotating status then drives the robotic arm to move. Each of the joint devices 2 includes a rotation module B1. The rotation module B1 includes a rotation machinery, which can include such as a motor 30, a first encoder 31, a second encoder 33 or a reducer 32. The encoder can be realized by an optical encoder, an electromagnetic encoder or an encoder of other types.

Refer to FIG. 2 again. The micro control circuit A1 receives a position command SIN then outputs a control signal S16 based on the position command SIN to control (or adjust) the rotation frequency of the rotation module B1. The micro control circuit A1 includes a first differential circuit 11, a position circuit 14, a second differential circuit 12, a speed circuit 15, a third differential circuit 13 and a current controller 16. The first differential circuit 11 receives a position command SIN then outputs a first differential signal S11 based on the position command SIN. The position circuit 14 is coupled to the first differential circuit 11 to receive the first differential signal S11 then outputs a position output signal S14 based on the first differential signal S11. The second differential circuit 12 is coupled to the position circuit 14 to receive the position output signal S14 then generates a second differential signal S12 based on the position output signal S14. The speed circuit 15 is coupled to the second differential circuit 12 to receive the second differential signal S12 then generates a speed output signal S15 based on the second differential signal S12. The third differential circuit 13 is coupled to the speed circuit 15 to receive the speed output signal S15 then generates a third differential signal S13 based on the speed output signal S15. The current controller 16 is coupled to the third differential circuit 13 to receive the third differential signal S13 then generates the control signal S16 to the rotation module B1 based on the third differential signal S13. Since the position circuit 14 can adjust the rotation position of the motor 30 and the speed circuit 15 can adjust the rotation speed of the motor 30, the current controller 16 can adjust the operating status of the motor 30 based on various adjustment information.

The micro control circuit A1 further includes an analog-to-digital circuit 17 (also referred as AD circuit) and a speed calculation circuit 18. The analog-to-digital circuit 17 is coupled to the third differential circuit 13 to output a digital signal S17 to the third differential circuit 13. Then, the third differential circuit 13, based on the digital signal S17 and the speed output signal S15, generates the third differential signal S13 to the current controller 16. Nonetheless, the circuit design in which transmission is implemented using analog signals can dispense with the analog-to-digital circuit 17. The speed calculation circuit 18 is coupled to the second differential circuit 12 to output a speed calculation signal S18 to the second differential circuit 12. Thus, the second differential circuit 12, based on the speed calculation signal S18 and the position output signal S14, generates a second differential signal S12.

The rotating mechanical equipment 1 includes a current sensor 34 and a gravity sensor 35. The current sensor 34 can be arranged inside or outside the rotation module B1 or at any position suitable for sensing a current. According to the embodiment in FIG. 2, the current sensor 34 is coupled to the micro control circuit A1 and the rotation module B1 to sense the current of the rotation module B1 then generates and output a current sensing signal 34 to the micro control circuit A1. Thus, the micro control circuit A1, based on the current of the rotation module B1, can adjust the rotating status of the rotation module B1 by adjusting the control signal S16. The gravity sensor 35 is coupled to the micro control circuit A1 to transmit a gravity signal S35 to the micro control circuit A1 to adjust the rotation frequency. The gravity sensor 35 can be arranged on the rotating mechanical equipment 1 (such as arranged on the robotic arm of the rotating mechanical equipment 1) to sense the moving status of the robotic arm (such as the rotation frequency or the gravitational acceleration in a specific axial direction) then generates the gravity signal S35. The gravity signal S35 generated by the gravity sensor 35 can be an analog signal transmitted to the analog-to-digital circuit inside the micro control circuit A1 (such as analog-to-digital circuit 17 or other AD circuit). Or, the gravity sensor 35 may include an analog-to-digital circuit 17, which converts the analog gravity signal S35 to a digital gravity signal S35.

The rotation module B1 is coupled to the micro control circuit A1 to receive the control signal S16 then operates at the rotation frequency based on the control signal S16. The rotation module B1 includes a motor 30, a first encoder 31, a second encoder 33 and a reducer 32. The motor 30 is coupled to the micro control circuit A1 to receive the control signal S16 then operates at the rotation frequency based on the control signal S16. That is, the rotation of the motor 30 is controlled to be at a specific frequency; in other words, the motor 30 rotates at a specific speed. The first encoder 31 is connected to the motor 30 to detect a rotation frequency of the motor 30 then generates a first detection signal S31 to the micro control circuit A1. The reducer 32 is connected to the motor 30 through the first encoder 31 to operate at the circled frequency based on the rotation frequency of the motor 30, and there exists a difference in speed reduction ratio between the circled speed outputted from the reducer 32 and the rotation speed outputted from the motor 30. The second encoder 33 is connected to the reducer 32 to detect a circled frequency of the reducer 32 then generates a second detection signal S33 to the micro control circuit A1, and the circled frequency of the reducer 32 is less than the rotation frequency of the motor 30. Moreover, the first encoder 31 is coupled to the speed calculation circuit 18 and the detection circuit 20, and the second encoder 33 is coupled to the first differential circuit 11, the speed calculation circuit 18 and the detection circuit 20 to respectively transmit the first detection signal S31 and the second detection signal S33 for further processing or/and operation.

Refer to FIG. 2 again. The rotating mechanical equipment 1 includes a detection circuit 20 and a vibration suppression circuit 21. The detection circuit 20 receives a position command SIN then generates a detection signal S20 based on the position command SIN. The vibration suppression circuit 21 is coupled to the detection circuit 20 to receive the detection signal S20 to suppress the vibration. The vibration may be caused by the rotation module B1 or may occur when the robotic arm (such as axial arms 3) operates. In other words, the application of the present invention is not limited to the joint devices 2.

Moreover, the detection circuit 20 includes a command operation circuit 22 and a judgment circuit 23. The command operation circuit 22 receives the position command SIN to calculate a command speed S22 of the position command SIN, that is, different position commands SIN correspond to different command speeds S22. The judgment circuit 23 is coupled to the command operation circuit 22 to receive the command speed S22 then compares the command speed S22 with command threshold TH1 to generate a judgment signal S23. Besides, the detection circuit 20, based on the judgment signal S23, starts a detection to detect an amplitude whose frequency is 2 times the rotation frequency then generates a detection signal S20. The detection circuit 20 can be coupled to the speed calculation circuit 18, the second encoder 33, the analog-to-digital circuit 17, the gravity sensor 35 or/and the first encoder 31 to detect a vibration of the rotation module B1 based on the speed calculation signal S18, the digital signal S17, the second detection signal S33 or/and the first detection signal S31 then generates the detection signal S20 for determining whether to activate the vibration suppression circuit 21 to perform a vibration suppression procedure. The vibration suppression circuit 21 includes a compensation coefficient and is coupled to the first encoder 31 and the second encoder 33 to receive the first detection signal S31 and the second detection signal S33 then calculates a compensation signal S21 based on the compensation coefficient, the first detection signal S31 and the second detection signal S33 and compensates a torque control loop. The compensation coefficient is used in the adjustment of the operating status of the rotation module B1, such as adjusting the operating status of the motor 30 or the reducer 32. The operating status is such as the rotation (or circled) speed or the rotation (or circled) frequency.

The vibration suppression circuit 21 is coupled to the torque control loop to output the compensation signal S21 to the torque control loop. The torque control loop includes a third differential circuit 13, a current controller 16, a motor 30, a current sensor 34 and an analog-to-digital circuit 17. Since the analog-to-digital circuit 17 can be selectively omitted in circuit design, the vibration suppression circuit 21 is coupled to the third differential circuit 13 to output the compensation signal S21 to the third differential circuit 13 to change the operating status of the motor 30. In other words, the third differential circuit 13, based on the compensation signal S21, the speed output signal S15 and the digital signal S17, generates the third differential signal S13 to the current controller 16 to adjust the motor current of the motor 30.

Figure 3:
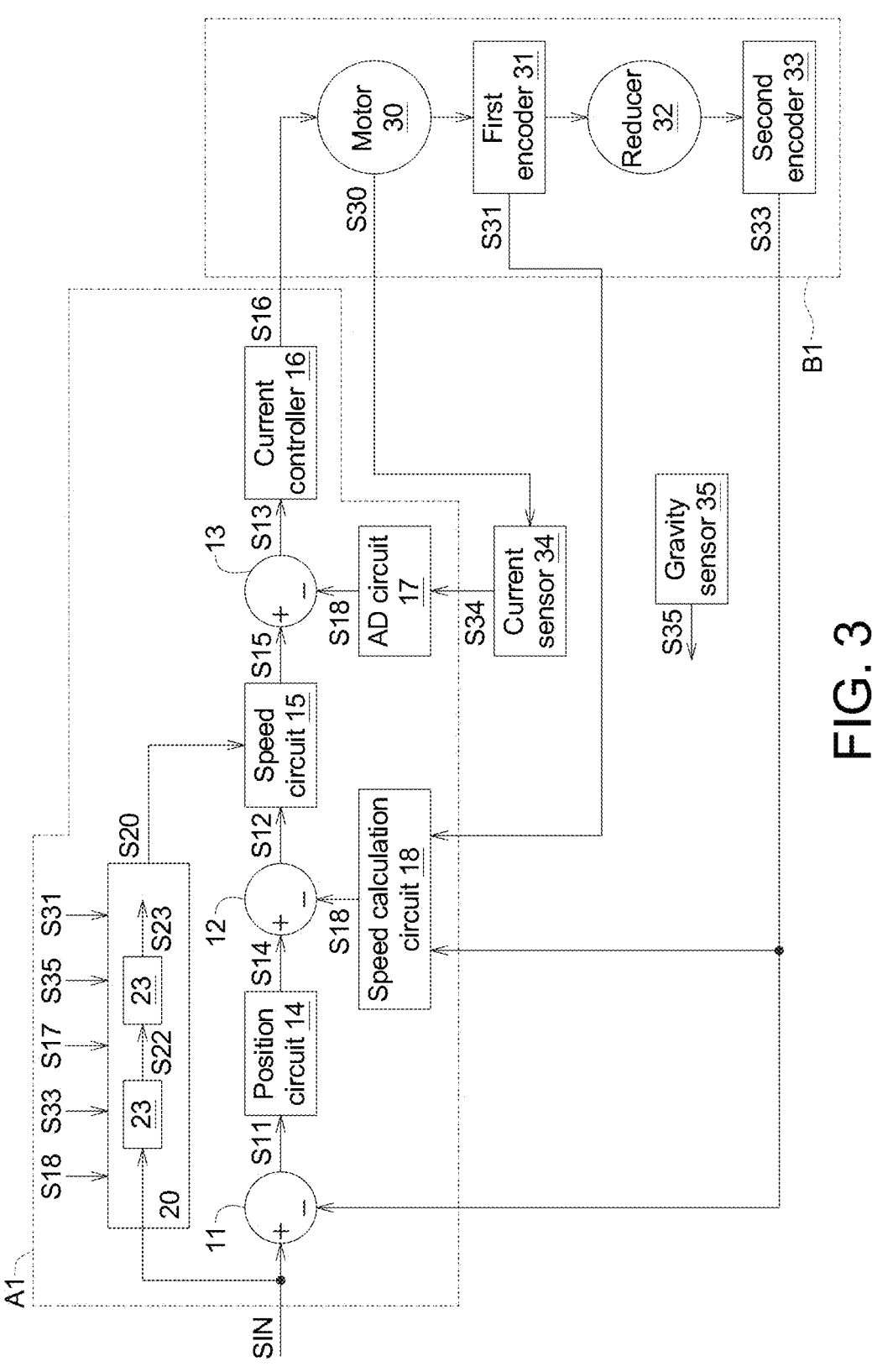
FIG. 3 is a circuit diagram of a second embodiment of partial circuits of a rotating mechanical equipment of the present invention.

Referring to FIG. 3, a circuit diagram of a second embodiment of partial circuits of the rotating mechanical equipment of the present invention is shown. The embodiment as indicated in FIG. 3 is different from the embodiment as indicated in FIG. 2. In the embodiment as indicated in FIG. 2, the status of the rotation module B1 is changed through the adjustment of the torque control loop. In the embodiment as indicated in FIG. 3, the vibration suppression circuit 21 is integrated in the speed circuit 15 to adjust the speed output signal S15. Thus, the detection circuit 20 outputs the detection signal S20 to the speed circuit 15, which then adjusts the speed output signal S15 based on the detection signal S20 and the second differential signal S12. As remaining technical contents of the embodiment as indicated in FIG. 3 are similar to that of the embodiment as indicated in FIG. 2, the similarities are not repeated here.

Figure 4:
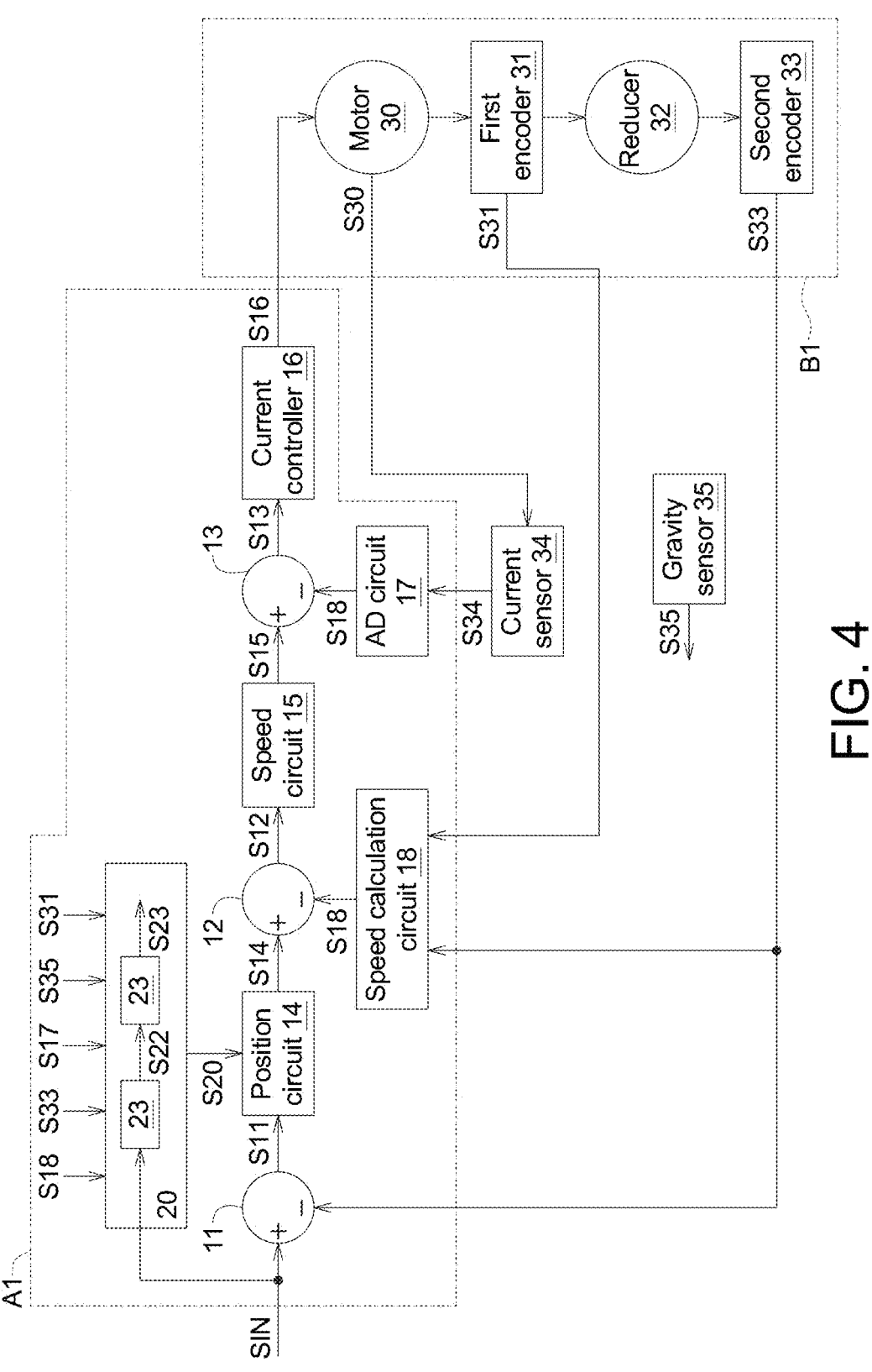
FIG. 4 is a circuit diagram of a third embodiment of partial circuits of a rotating mechanical equipment of the present invention.

Referring to FIG. 4, a circuit diagram of a third embodiment of partial circuits of a rotating mechanical equipment of the present invention is shown. The embodiment as indicated FIG. 4 is different from the embodiments as indicated in FIGS. 2 and 3. In the embodiment as indicated in FIG. 4, the vibration suppression circuit 21 is integrated inside the position circuit 14 to adjust the position output signal S14, so that the detection circuit 20 outputs the detection signal S20 to the position circuit 14, which then adjusts the position output signal S14 based on the detection signal S20 and the first differential signal S11. Besides, it is feasible to integrate the position circuit 14 or the speed circuit 15 in the vibration suppression circuit 21. As remaining technical contents of the embodiment as indicated in FIG. 4 are similar to that of the embodiment as indicated in FIG. 2, the similarities are not repeated here.

Figure 5:
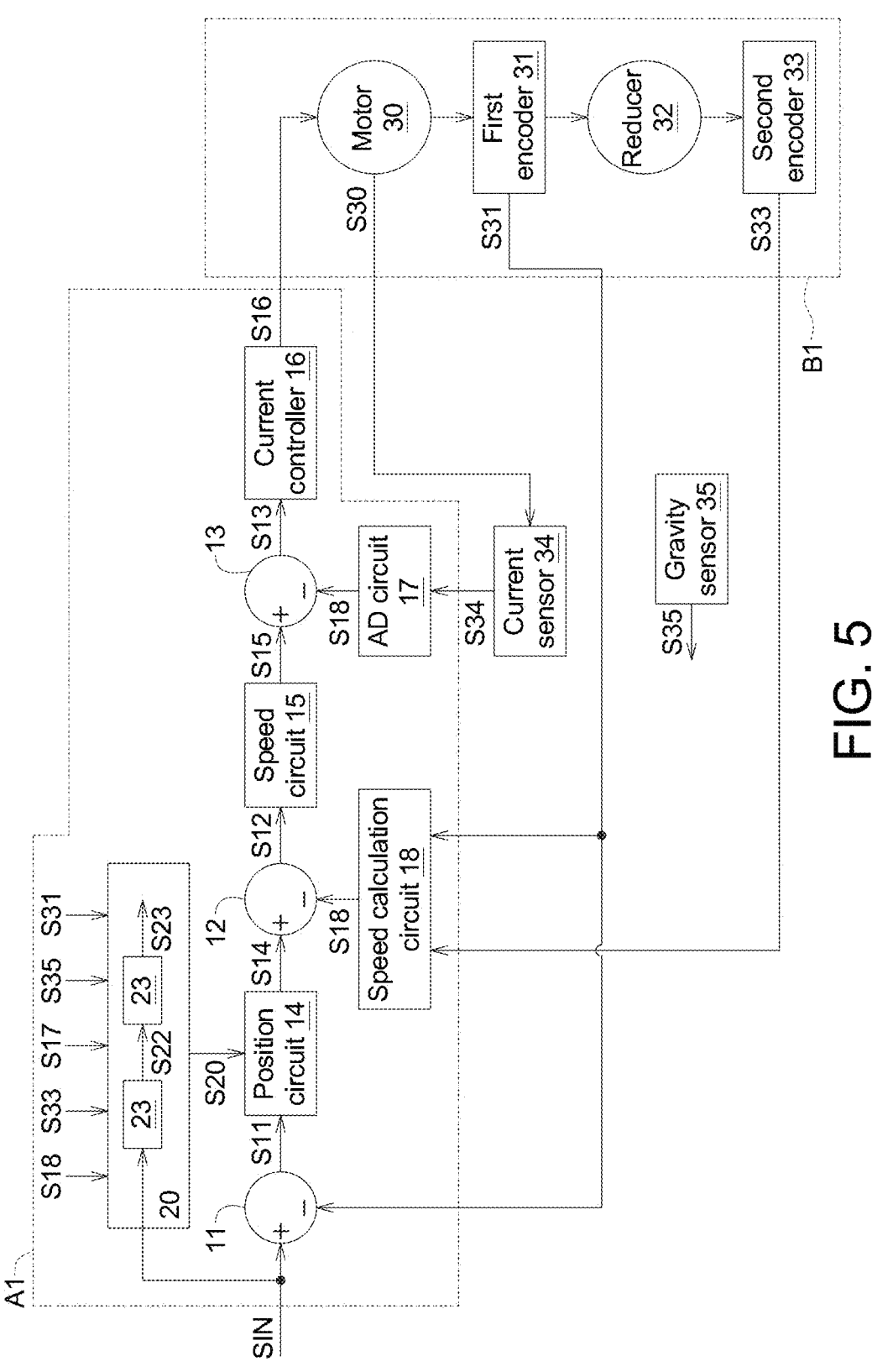
FIG. 5 is a circuit diagram of a fourth embodiment of partial circuits of a rotating mechanical equipment of the present invention.

Referring to FIG. 5, a circuit diagram of a fourth embodiment of partial circuits of a rotating mechanical equipment of the present invention is shown. The arrangement for obtaining the first differential signal S11 as indicated in FIG. 5 is different from the embodiments as indicated in FIGS. 2 to 4. That is, the first differential circuit 11 is coupled to the first encoder 31 to obtain the first differential signal S11 based on the first detection signal S31. Thus, the first differential circuit 11 is not coupled to the second encoder 33; instead, the first differential circuit 11 is coupled to the first encoder 31 to receive the position command SIN and the first detection signal S31 then outputs the first differential signal S11 based on the position command SIN and the first detection signal S31. The second differential circuit 12 is coupled to the first differential circuit 11 and the first encoder 31 to generate the second differential signal S12 based on the first differential signal S11 and the first detection signal S31. The third differential circuit 13 is coupled to the second differential circuit 12 and the motor 30 to generate the third differential signal S13 based on the second differential signal S12 and the motor current S30 for the generation of the control signal S16. Besides, technical contents of the embodiments as indicated in FIG. 2 to FIG. 5 can be obtained with reference to each other.

Figure 6:
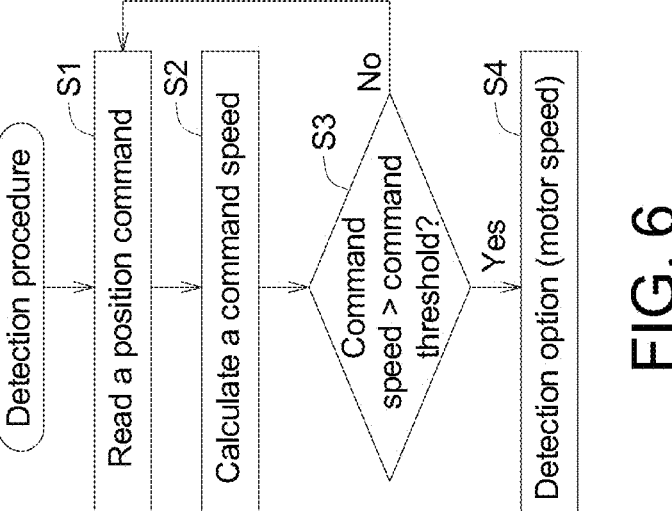
FIG. 6 is a flowchart of a first embodiment of position command detection using a detection circuit of the present invention.

Referring to FIG. 6, a flowchart of a first embodiment of position command detection using the detection circuit of the present invention is shown. At the initial operation of the rotating mechanical equipment 1, the rotating mechanical equipment 1 receives a position command SIN, and the detection circuit 20 starts a detection procedure based on the position command SIN. In step S1, a position command SIN is read by the detection circuit 20, and the detection circuit 20 may include a read circuit for reading the position command SIN received by the rotating mechanical equipment 1 (such as the control host 4) or the position command SIN is directly inputted to the detection circuit 20; the present embodiment does not have specific restrictions in this regard. In step S2, the position command SIN is calculated by the command operation circuit 22 to obtain a command speed S22. In step S3, the command speed S22 is compared with a command threshold TH1 by the judgment circuit 23 to determine whether the command speed S22 is greater than the command threshold TH1. If it is determined that the command speed S22 is greater than command threshold TH1, this indicates that the position command SIN has control over the rotation module B1 and causes the rotation module B1 having a likelihood of vibration. Then, the method proceeds to step S4, the result of the motor 30 controlled by the micro control circuit A1 based on the position command SIN is detected. In the embodiment as indicated in FIG. 6, a detection is performed based on the rotation speed of the motor 30 (that is, the motor speed); that is, the speed calculation circuit 18 generates the speed calculation signal S18 to the detection circuit 20 based on the first detection signal S31 to determine whether the motor speed controlled by the position command SIN causes vibration. In step S3, if it is determined that the command speed S22 is less than or equivalent to the command threshold TH1, this indicates that the control over the rotation module B1 by the position command SIN is unlikely to cause vibration to the rotation module B1, and the method returns to step S1 to detect the next position command. According to product requirements (for instance, vibration suppression has a wider range), the criteria for determining whether the method proceeds to step S4 can be changed as whether the command speed S22 is less than the command threshold TH1 or whether the command speed S22 is greater than or equivalent to the command threshold TH1.

Figure 7:
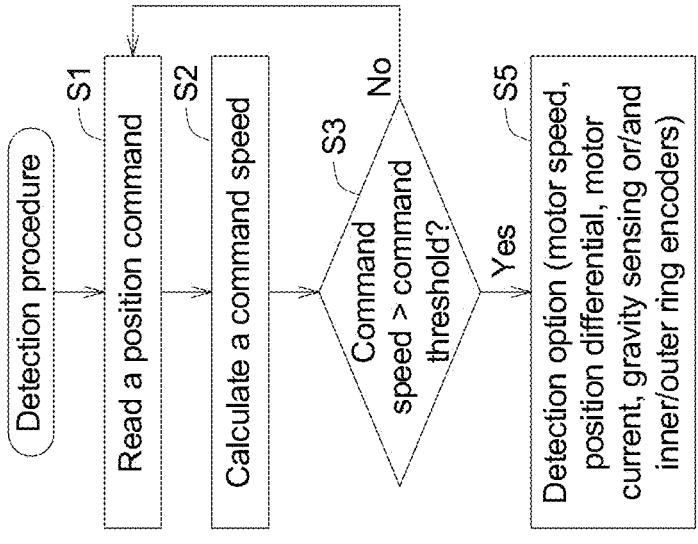
FIG. 7 is a flowchart of a second embodiment of position command detection using a detection circuit of the present invention.

Referring to FIG. 7, a flowchart of a second embodiment of position command detection using the detection circuit of the present invention is shown. As indicated in the diagram, the detection procedure contains five detection options, namely the detection of motor speed, the detection of position differential, the detection of motor current, the detection of gravity sensing, or/and the detection of inner/outer ring encoders. The inner ring encoder (that is, the first encoder 31) is for measuring the motor 30; the outer ring encoder (that is, the second encoder 33) is for measuring the reducer 32. Detection can be performed based on one or all of the five detection options of the detection procedure, and then the vibration information with the largest amplitude can be selected as a basis for adjusting the compensation coefficient.

Figure 8:
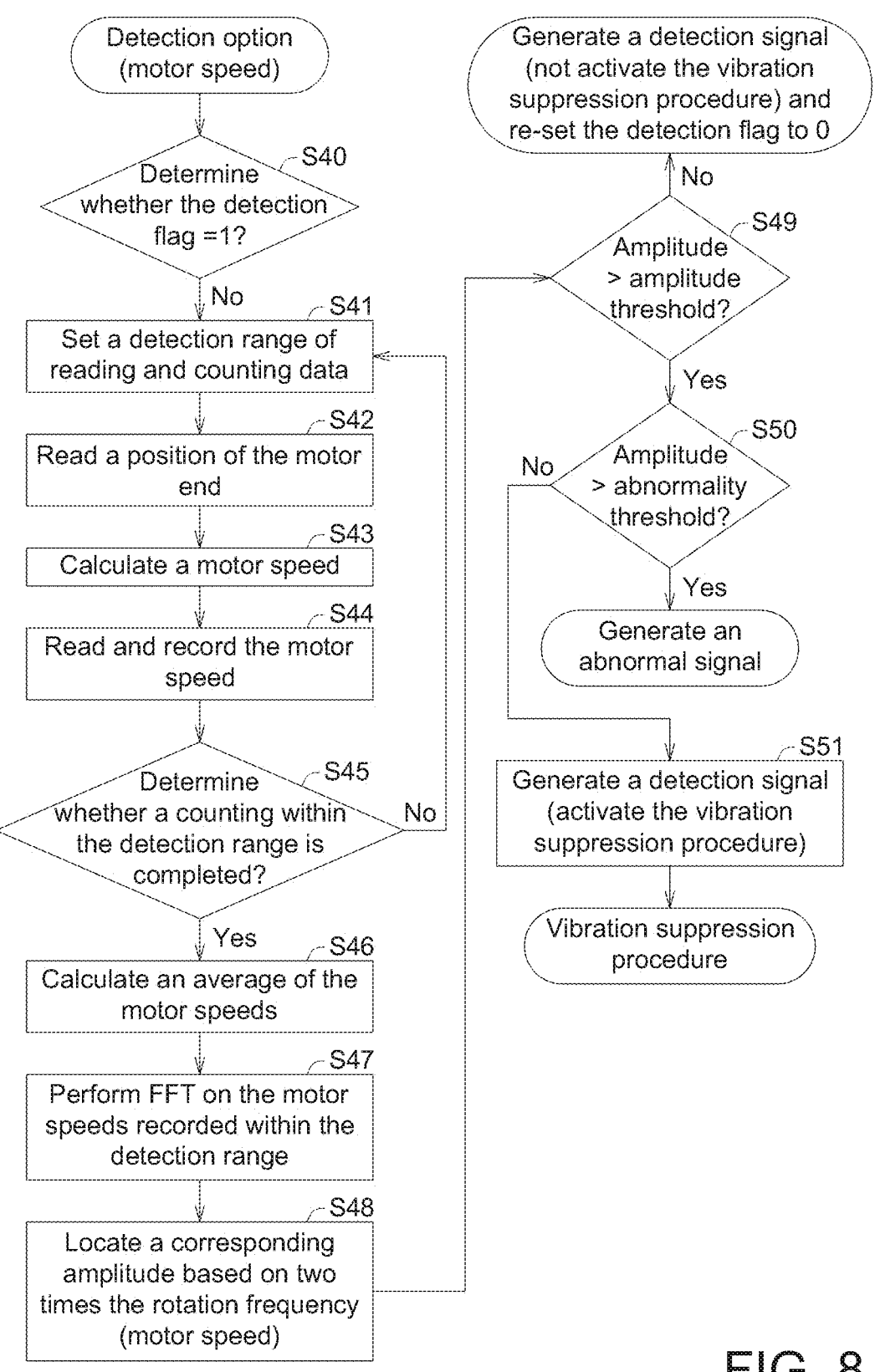
FIG. 8 is a flowchart of a first embodiment of vibration detection using a rotating mechanical equipment of the present invention.
Figure 14:
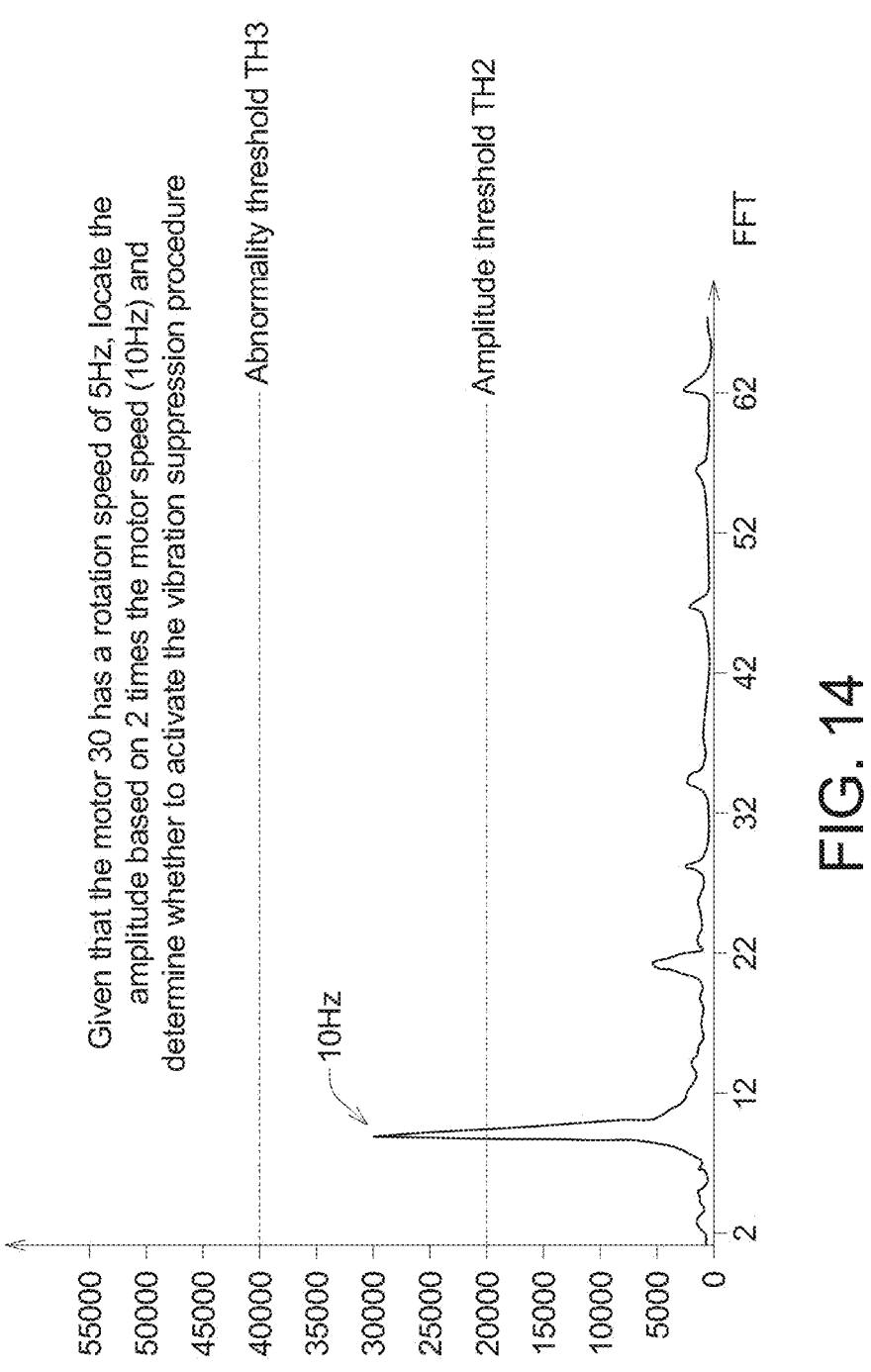
FIG. 14 is a waveform chart of an embodiment of vibration detection based on 2 times the rotation frequency according to the present invention.

Referring to FIG. 8, a flowchart of a first embodiment of vibration detection using a rotating mechanical equipment of the present invention is shown. As indicated in the diagram, the rotating mechanical equipment 1 determines whether vibration occurs by searching the information of motor speed. In step S40, whether the same position command SIN having a likelihood of vibration has been located in the stored detection information is checked, wherein the detection information can be a detection flag. Thus, whether the detection flag=1 is checked: if the detection flag=1, this indicates that the corresponding position command SIN has a likelihood of vibration. When the rotating mechanical equipment 1 is just activated, the detection flag should be equivalent to 0 (that is, the detection flag≠1). In step S41, given that the rotating mechanical equipment 1 operates continuously, there are several items of information relevant to motor speed, therefore the range of reading and counting information (or data) is pre-set, wherein the range of the data to be detected (such as 512 items of data) is referred as detection range. In step S42, the position of the motor end is read, that is, the first detection signal S31 is read. In step S43, the motor speed is calculated based on the first detection signal S31. In step S44, the calculated motor speed is read and recorded. Thus, the vertical axis of FIG. 14 representing amplitude can be obtained. In step S45, whether the 512 items of data within the detection range are completely read is determined, that is, whether the counter shows a count of 512 is determined.

Figure 13:
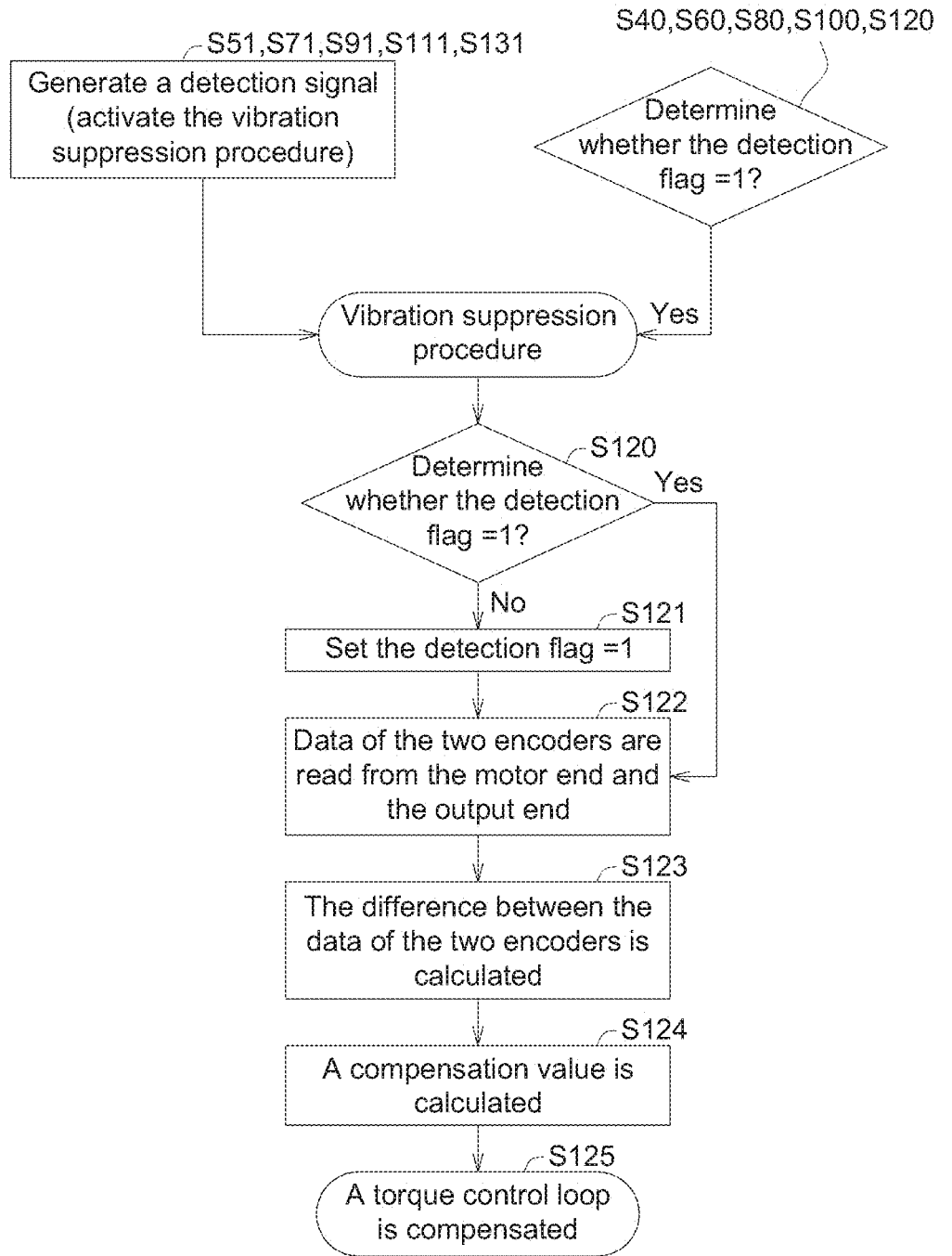
FIG. 13 is a flowchart of an embodiment of the calculation of a compensation coefficient using a rotating mechanical equipment of the present invention.

In step S46, the average of 512 items of information relevant to motor speed is calculated. In step S47, the 512 items of information relevant to motor speed within the detection range are converted to rotation frequencies using a fast Fourier transform (FFT), so that the horizontal axis of FIG. 14 representing frequency can be obtained. In step S48, the corresponding amplitude of the rotation module B1 is located based on 2 times the rotation frequency. In step S49, whether the amplitude corresponding to 2 times the rotation frequency is greater than the amplitude threshold TH2 is determined (as indicated in FIG. 14). If it is the amplitude is less than or equivalent to amplitude threshold TH2, the detection signal S20 for not activating the vibration suppression procedure is generated by the detection circuit 20 and the detection information is re-set to 0, the detection procedure terminates. If it is determined that the amplitude is greater than amplitude threshold TH2, the method proceeds to step S50 where whether the amplitude is greater than the abnormality threshold TH3 is also checked (as indicated in FIG. 14). If the amplitude is also greater than the abnormality threshold TH3, this indicates that the rotation module B1 has abnormality which could be caused by the aging, loosing or erroneous assembly of the parts. In other words, the quality of the components and composition of the rotation machinery affect the rotation frequency during operation. Thus, the detection circuit 20 will additionally generate an abnormality signal to the control host 4 to control the rotating mechanical equipment 1 to stop operation or emit a warning message. In step S50, if the amplitude is not greater than the abnormality threshold TH3, the detection signal S20 for activating the vibration suppression procedure is generated to the vibration suppression circuit 21 by the detection circuit 20, the method proceeds to the suppression procedure (as indicated in FIG. 13).

Figure 9:
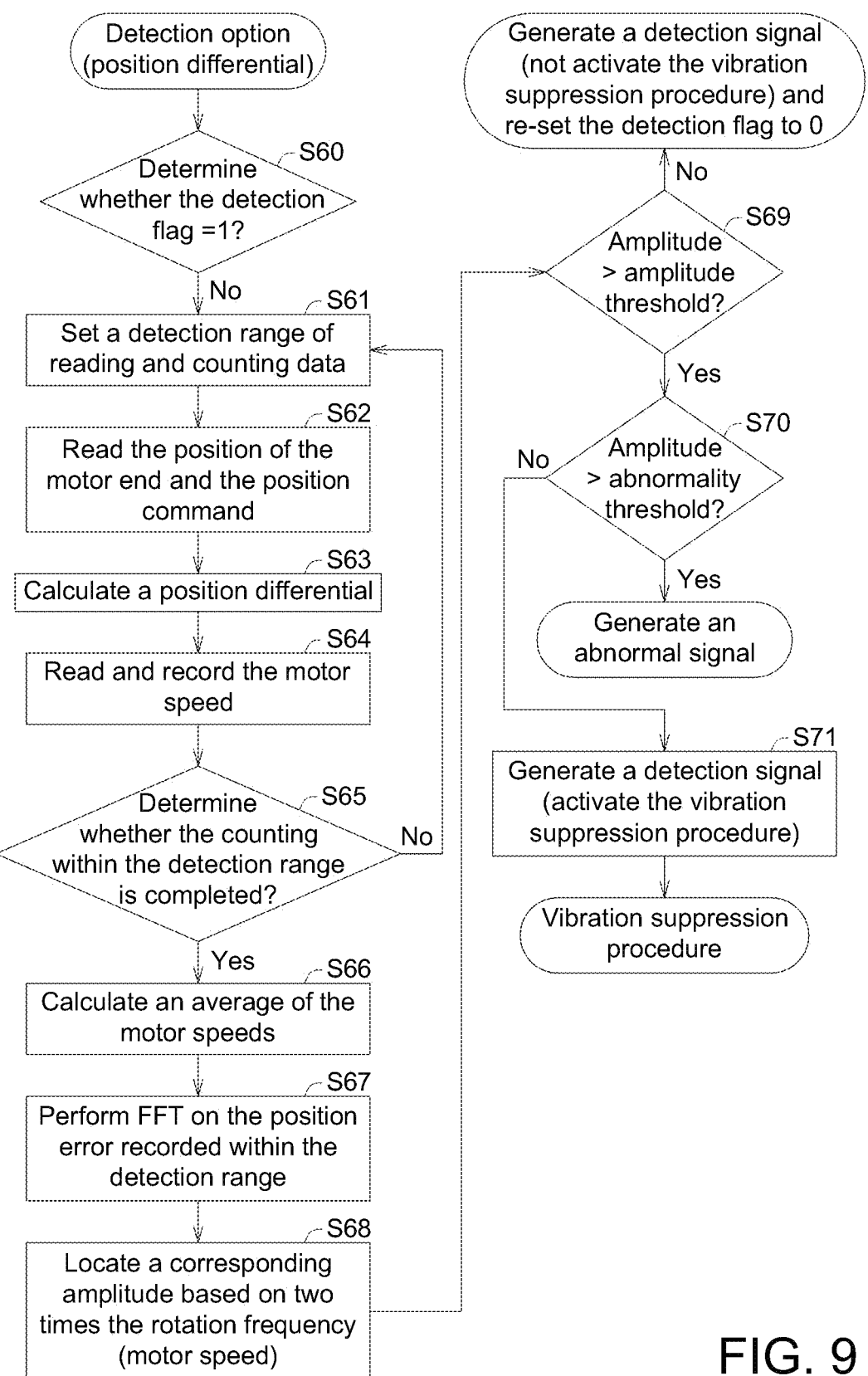
FIG. 9 is a flowchart of a second embodiment of vibration detection using a rotating mechanical equipment of the present invention.

Referring to FIG. 9, a flowchart of a second embodiment of vibration detection using a rotating mechanical equipment of the present invention is shown. The embodiment as indicated in FIG. 9 is different from the embodiment as indicated in FIG. 8. In the embodiment as indicated in FIG. 8, vibration is searched based on the information relevant to motor speed. In the embodiment as indicated in FIG. 9, vibration is detected based on position differential. That is, in the embodiment as indicated in FIG. 9, vibration is detected based on the difference between the actual rotation position of the motor 30 and the target position of the position command SIN. As disclosed above, the position command SIN corresponds to the command speed S22, and the command speed S22 corresponds to a target position at which the motor 30 rotating at a specific speed will arrive. Therefore, position differential is also one of the implementations of vibration detection. In other words, whenever vibration occurs, the rotation position of the motor 30 is not the target position of the position command SIN. Similarly, the circled position of the reducer 32 is not the corresponding position of the position command SIN (relative to the speed reduction ratio). In the embodiment as indicated in FIG. 9, each item of position differential data is converted to a rotation frequency using FFT, and whether the amplitude is over the amplitude threshold TH2 is checked based on 2 times the rotation frequency. As the technical contents of the step 61, step 65, step 66, step 68 and steps 69-71 of FIG. 9 are similar to that of the step 41, step 45, step 46, step 48 and steps 49-51 of FIG. 8, the similarities are not repeated here.

Figure 10:
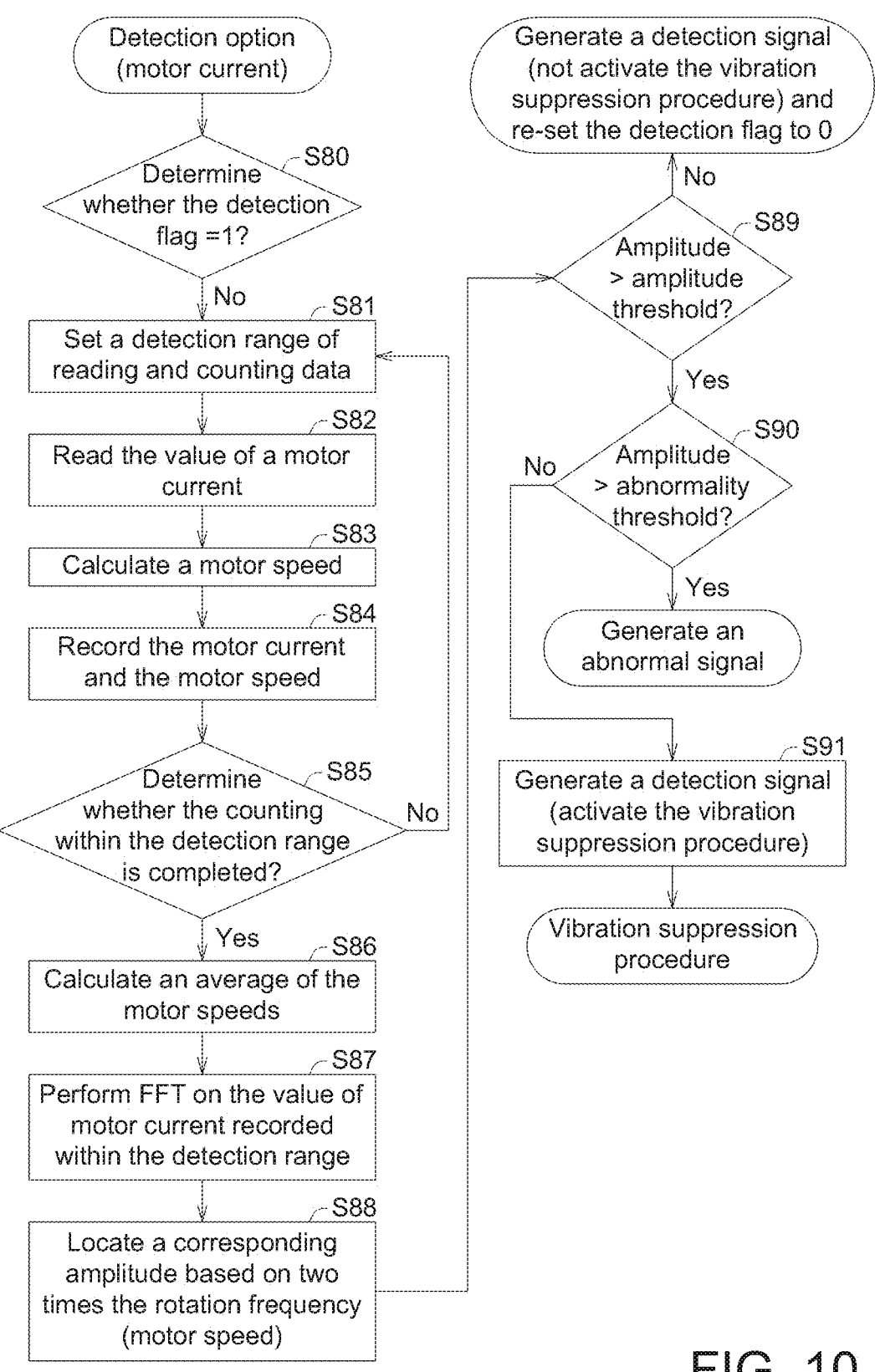
FIG. 10 is a flowchart of a third embodiment of vibration detection using a rotating mechanical equipment of the present invention.

Referring to FIG. 10, a flowchart of a third embodiment of vibration detection using a rotating mechanical equipment of the present invention is shown. Unlike the previous embodiment, in the embodiment as indicated in FIG. 10, vibration detection of the rotating mechanical equipment 1 is based on the information relevant to motor current. Therefore, after sensing the motor 30, the current sensor 34 generates a current sensing signal S34, reads and counts data within the detection range, that is, the number of times of sensing the motor 30 (data volume). Apart from 512 items of data, the number of data items can be 256 or 1024, and the present embodiment does not have specific restrictions in this regard. In the embodiment as indicated in FIG. 10, after motor current and motor speed are recorded, the information relevant to motor current are converted to rotation frequencies using FFT. As the technical contents of the step 81, step 85, step 86, step 88 and steps 89-91 of FIG. 10 are similar to that of the step 61, step 65, step 66, step 68 and steps 69-71 of FIG. 9, the similarities are not repeated here.

Figure 11:
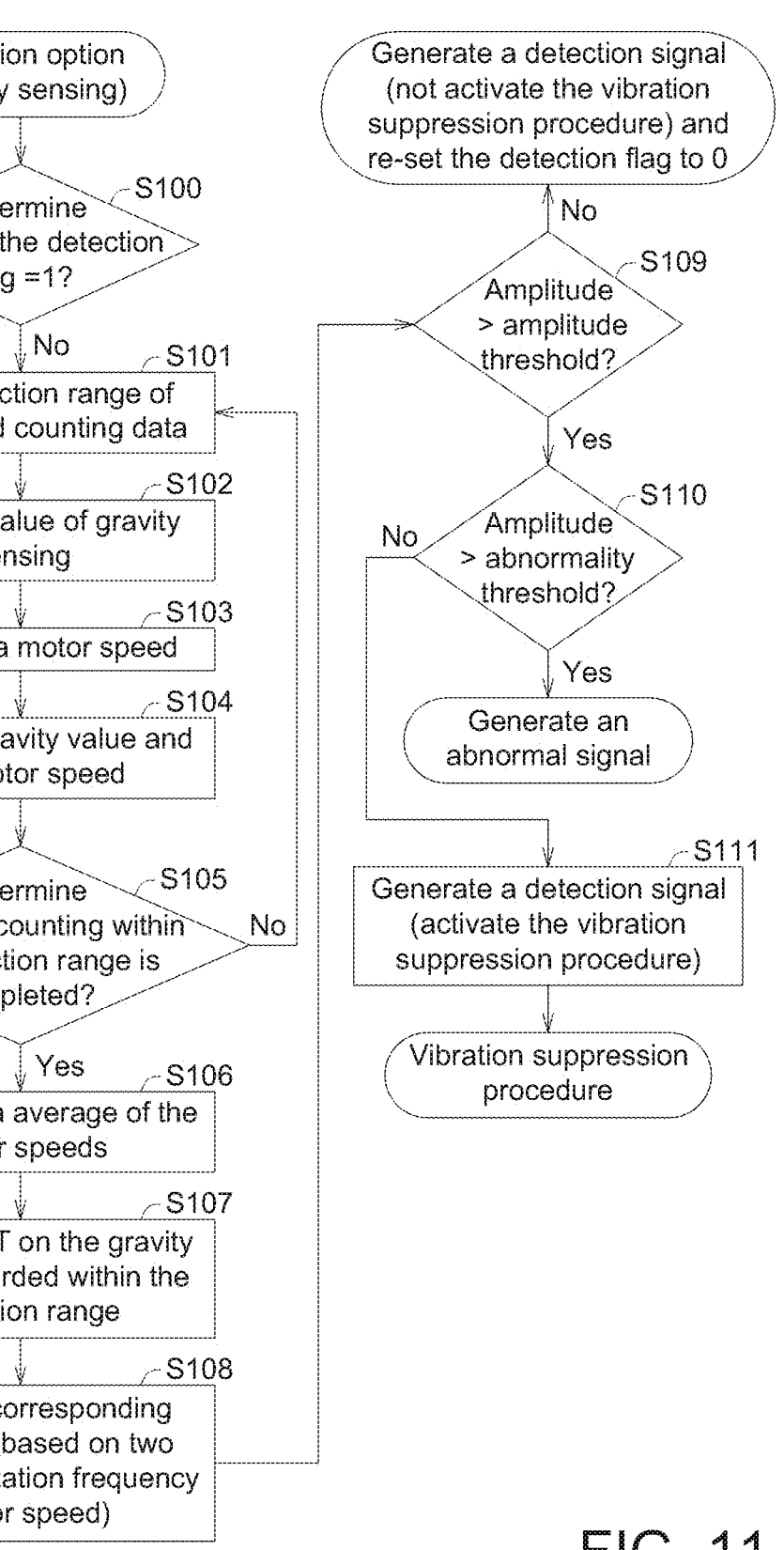
FIG. 11 is a flowchart of a fourth embodiment of vibration detection using a rotating mechanical equipment of the present invention.

Referring to FIG. 11, a flowchart of a fourth embodiment of vibration detection using a rotating mechanical equipment of the present invention is shown. Unlike the previous embodiment, in the embodiment as indicated in FIG. 11, vibration detection of the rotating mechanical equipment 1 is based on the information relevant to gravity sensing. Therefore, the gravity sensor 35 senses the movement of the robotic arm to obtain a sensed value of gravity then generates a gravity signal S35 to the detection circuit 20. In the embodiment as indicated in FIG. 11, after the gravity value and the motor speed are recorded, all information relevant to gravity value are converted to rotation frequencies using FFT. As the technical contents of the step 101, step 105, step 106, step 108 and steps 109-111 of FIG. 11 are similar to that of the step 81, step 85, step 86, step 88 and steps 89-91 of FIG. 10, the similarities are not repeated here.

Figure 12:
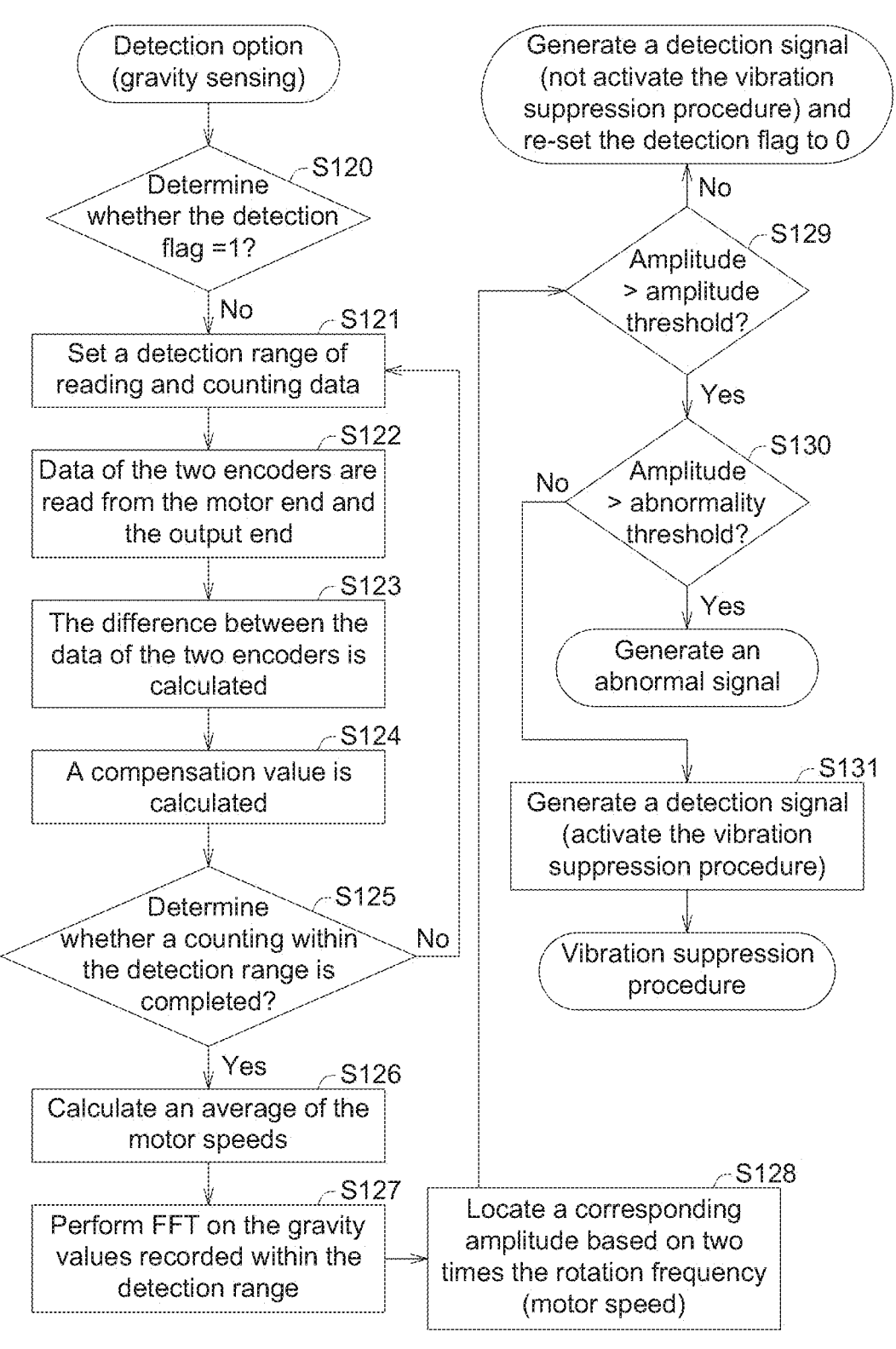
FIG. 12 is a flowchart of a fifth embodiment of vibration detection using a rotating mechanical equipment of the present invention.

Referring to FIG. 12, a flowchart of a fifth embodiment of vibration detection using a rotating mechanical equipment of the present invention is shown. In the embodiment as indicated in FIG. 12, vibration detection is based on the information relevant to inner/outer ring encoders. That is, the rotating mechanical equipment 1 (the detection circuit 20) detects vibration based on the first detection signal S31 and the second detection signal S33 generated by the first encoder 31 and the second encoder 33, respectively. In step S123, the difference of encoder data and the motor speed are calculated. In step S124, the difference data and the motor speed are recorded. In step S127, the information relevant to two encoders are converted to rotation frequencies using FFT. Like the previous four embodiments, corresponding amplitude is located based on 2 times the rotation frequency (equivalent to 2 times the motor speed). As the technical contents of the step 121, step 125, step 126, step 128 and step 129-131 of FIG. 12 are similar to that of the step 101, step 105, step 106, step 108 and steps 109-111 of FIG. 11, the similarities are not repeated here. In other words, in the embodiments of the five detection options, although the steps 42-44 and step 47, the steps 62-64 and step 67, the steps 82-84 and step 87, the steps 102-104 and step 107 and the steps 122-124 and step 127 are respectively based on different detection data and different information, fundamental techniques of the five detection options are the same. They all serve to detect vibration.

Referring to 13, a flowchart of an embodiment of the calculation of compensation coefficient using a rotating mechanical equipment of the present invention is shown. In step 121 of the embodiment as indicated in FIG. 13, the detection flag is set to 1, that is, in the detection procedure, after the detection of the position command SIN is completed, it is recorded in the detection information that the current position command SIN has a likelihood of causing vibration to the rotation module B1. Moreover, in step S122, the information relevant to inner/outer ring encoders are read, that is, data of the two encoders are read at the motor end and the output end (that is, the reducer end). After the difference between the data of the two encoders obtained in step S123 is calculated, the method proceeds to step S124 where a compensation value (that is, the compensation signal S21) can be calculated based on the difference of the two encoders and the compensation coefficient. Thus, in step S125, a torque control loop is compensated.

As disclosed above, the vibration suppression procedure records the likelihood of the current position command SIN causing vibration to the rotation module B1. Therefore, in subsequent operations of the rotating mechanical equipment 1, whenever the same position command SIN is received, once the stored detection information is detected (such as the step S40 of FIG. 8, the step S60 of FIG. 9, the step S80 of FIG. 10, the step S100 of FIG. 11 and the step S120 of FIG. 12), remaining steps of detection procedure can be omitted and the vibration suppression procedure can be activated instantly as indicated in the top right corner of FIG. 13. The detection signal for activating the vibration suppression procedure is generated after step S51, step S71, step S91, step S111 and step 131 are performed (through all detection steps) as indicated in the top left corner of FIG. 13.

To summarize, the present invention provides a rotating mechanical equipment. The rotating mechanical equipment detects a vibration based on 2 times the rotation frequency to achieve the vibration suppression and improve the performance and accuracy of the equipment.

Moreover, after the detection module of the rotating mechanical equipment (such as including the detection circuit and the vibration suppression circuit) operates the detection procedure, the detection information is stored, and subsequent operations are performed based on the detection information, so that a large part of the detection procedure can be omitted. Furthermore, since the vibration suppression procedure is activated (that is, the vibration suppression circuit is activated) and there is no need to perform the whole process of the detection procedure, the work schedule is reduced (that is, the detection time is reduced). The present invention can be used in one or more than one device of the equipment to resolve respective or collective vibration problem.

While the invention has been described by way of example and in terms of the embodiment(s), it is to be understood that the invention is not limited thereto. According to the technical features embodiments of the present invention, a person ordinarily skilled in the art will be able to make various modifications and similar arrangements and procedures without breaching the spirit and scope of protection of the invention. Therefore, the scope of protection of the present invention should be accorded with what is defined in the appended claims.

What is claimed is:

1. A rotating mechanical equipment, comprising:
a micro control circuit used to receive a position command then generates a control signal based on the position command to control a rotation frequency; and
a rotation module comprising:
a motor coupled to the micro control circuit to receive the control signal then operates at the rotation frequency based on the control signal;
a first encoder connected to the motor to detect the rotation frequency of the motor then generates a first detection signal;
a reducer connected to the motor through the first encoder to operate at a circled frequency based on the rotation frequency of the motor;
a second encoder connected to the reducer to detect the circled frequency of the reducer then generates a second detection signal to the micro control circuit; and a detection circuit configured to detect vibration based on an amplitude of the second detection signal at a frequency equal to 2 times the rotation frequency.

2. The rotating mechanical equipment according to claim 1, wherein the rotating mechanical equipment detects the vibration of the reducer based on 2 times the rotation frequency.

3. The rotating mechanical equipment according to claim 1, wherein the micro control circuit comprises:
a first differential circuit used to receive the position command then outputs a first differential signal based on the position command; and
a position circuit coupled to the first differential circuit to receive the first differential signal then outputs a position output signal based on the first differential signal;
a second differential circuit coupled to the position circuit to receive the position output signal then generates a second differential signal based on the position output signal;
a speed circuit coupled to the second differential circuit to receive the second differential signal then generates a speed output signal based on the second differential signal;
a third differential circuit coupled to the speed circuit to receive the speed output signal then generates a third differential signal based on the speed output signal; and
a current controller coupled to the third differential circuit to receive the third differential signal then generates the control signal based on the third differential signal.

4. The rotating mechanical equipment according to claim 1, comprising:
a robotic arm; and
a gravity sensor arranged on the robotic arm to generate a gravity signal based on the rotation frequency and coupled to a micro control circuit to transmit the gravity signal to the micro control circuit to adjust the rotation frequency.

5. A rotating mechanical equipment, comprising:
a detection circuit used to receive a position command then generates a detection signal based on the position command; and
a vibration suppression circuit coupled to the detection circuit to receive the detection signal to suppress a vibration,
wherein the detection circuit comprises:
a command operation circuit used to receive the position command to calculate a command speed of the position command; and
a judgment circuit coupled to the command operation circuit to receive the command speed then compares the command speed with a command threshold to generate a judgment signal;
wherein the detection circuit starts a detection based on the judgment signal and generates the detection signal when an amplitude whose frequency is detected as 2 times a rotation frequency.

6. A rotating mechanical equipment, comprising:
a detection circuit used to receive a position command then generates a detection signal based on the position command; and
a vibration suppression circuit coupled to the detection circuit to receive the detection signal to suppress a vibration, wherein the detection circuit detects the vibration based on 2 times a rotation frequency to generate the detection signal,
wherein the vibration suppression circuit comprises a compensation coefficient and is coupled to a first encoder and a second encoder to receive a first detection signal and a second detection signal then calculates a compensation signal based on the compensation coefficient, the first detection signal and the second detection signal to compensate a torque control loop.

*    *    *    *    *